Patented May 10, 1949

2,469,693

UNITED STATES PATENT OFFICE 2,469,693

ANION ACTIVE RESINS PREPARED FROM ALKYLENE POLYAMINES AND HYDROXY-SUBSTITUTED ALIPHATIC POLYHALIDES

Lennart A. Lundberg, Stamford, Conn., assignor to American Cyanamid Company, New York, N. Y., a corporation of Maine No Drawing. Application October 25, 1945, Serial No. 624,606

9 Claims. (Cl. 260—2)

This invention relates to resins suitable for the removal of anions from fluid media and to processes of purifying fluid media by means of such resins.

An object of the present invention is to provide a resinous material which is insoluble in water and which is suitable for removing anions from water and other fluid media.

Another object of the present invention is to prepare an anion active resin from an hydroxy aliphatic polyhalide and a polyamine.

A further object of the present invention is to provide a process of producing resinous materials suitable for the removal of anions from fluid media.

These and other objects are attained by condensing an aliphatic polyhalide which contains an hydroxy group in beta position to each of the halogens with an alkylene polyamine.

Still another object of the present invention is to provide an improved process for removing anions from water and other fluid media.

This object is attained by contacting a fluid containing anions with an insoluble resin prepared in the manner described above.

The following examples in which the proportions are in parts by weight are given by way of illustration and not in limitation.

Example 1

| | Parts |
|---|---|
| Glycerol dichlorohydrin (17.5 mols) | 2,258 |
| Tetraethylenepentamine (10 mols) | 1,890 |
| Water | 6,000 |
| Sodium hydroxide (10 mols) | 400 |

The tetraethylenepentamine is charged into a suitable reaction vessel provided with an agitator and a steam jacket or other means of heating, and 5000 parts of water are added thereto. The resulting solution is heated and the glycerol dichlorohydrin added rapidly to the hot agitated solution.

After this addition is complete, the mixture is heated for about 1.5 hours. A clear solution, which becomes opaque on cooling due to the separation of an oily phase, results. The chilled syrup is transferred to another vessel, similarly equipped with heating means, and the sodium hydroxide dissolved in 1000 parts of water is added. The resulting mixture is heated and gelatin occurs with a slight evolution of heat within 5 minutes.

The opaque, orange-colored, firm gel is broken up into small pieces, placed in trays and cured in an oven at a temperature of about 95°–105° C. for about 17–18 hours. The cured resin is ground and screened, and the 20–40 mesh material is placed in a suitable bed through which water containing 0.004 N sulfuric acid and 0.002 N HCl is passed. The resin removes the acid from the water and its capacity is found to be 15.9 kilograins (hereinafter abbreviated "kgrs.") of calcium carbonate per cubic foot of resin. The resin has a density of about 8.4 lbs./cu. ft.

Example 2

| | Parts |
|---|---|
| Glycerol dichlorohydrin (20 mols) | 2,580 |
| Tetraethylenepentamine (10 mols) | 1,890 |
| Water | 6,000 |
| Sodium hydroxide (15 mols) | 600 |

The sodium hydroxide is dissolved in 1000 parts of the water and the substances are reacted in the manner described in Example 1 to produce a resin having a capacity for removing anions equivalent to about 20.3 kgrs. of calcium carbonate per cubic foot of resin and a density of about 9.3 lbs./cu. ft.

Example 3

The procedure of Example 2 may be modified somewhat and the preparation of the resin carried out as a two-step process. 1613 parts of the glycerol dichlorohydrin (12.5 mols) is first added to the hot agitated solution of tetraethylenepentamine in 4500 parts of water. The aqueous mixture is heated for about 1.5 hours, and the resulting solution transferred to another vessel and cooled to about 25° C. A solution of the sodium hydroxide in 1500 parts of water is added with stirring and then the remaining 968 parts (7.5 mols) of glycerol dichlorohydrin is introduced. The mixture is heated by steam and gelation occurs within 5 minutes. Although this reaction is more exothermic than that resulting from the unmodified process of Example 2, the gels are similar in appearance.

The gel obtained according to the two-step process of this example was granulated, cured, ground and screened as described in Example 1. The resulting resin has a capacity for removing anions of about 20.6 kgrs. of calcium carbonate per cubic foot of resin and a density of about 9.9 lbs./cu. ft.

Example 4

| | Parts |
|---|---|
| Glycerol dichlorohydrin (25 mols) | 3,225 |
| Tetraethylenepentamine (10 mols) | 1,890 |
| Water | 7,000 |
| Sodium hydroxide (25 mols) | 1,000 |

The sodium hydroxide is dissolved in 2000 parts of water and the procedure of Example 1 is followed. A resin is produced having a capacity for removing anions which varies from about 17.2 kgrs. to about 26.9 kgrs. of calcium carbonate per cubic foot of resin. The density of the resin may vary from about 12.1 to about 15.9 lbs./cu. ft.

*Example 5*

The resin of Example 4 is prepared by the two-step process of Example 3, using a solution of sodium hydroxide in 1500 parts of water, and adding 1613 parts (12.5 mols) of the glycerol dichlorohydrin in the first step. The density of the resulting resin varies from about 13.1 lbs./cu. ft. to about 15.0 lbs./cu. ft. while its capacity for removing anions is about 20.7 kgrs. to about 22.4 kgrs. of calcium carbonate per cubic foot of resin.

*Example 6*

| | Parts |
|---|---|
| Glycerol dichlorohydrin (30 mols) | 3,870 |
| Tetraethylenepentamine (10 mols) | 1,890 |
| Water | 8,000 |
| Sodium hydroxide (35 mols) | 1,400 |

The sodium hydroxide is dissolved in 2000 parts of water and the substances are reacted as in Example 1 to produce a resin having a capacity for removing anions equal to about 21.5 kgrs. of calcium carbonate per cubic foot of resin and a density of about 12.3 lbs./cu. ft.

*Example 7*

The ingredients of Example 6 are reacted according to the two-step process of Example 3, the sodium hydroxide being dissolved in 2000 parts of water and 1613 parts (12.5 mols) of glycerol dichlorohydrin being added in the first step. The resulting resin has a density of about 12.2 lbs./cu. ft. and a capacity for removal of anions of about 22.5 kgrs. of calcium carbonate per cubic foot of resin.

*Example 8*

| | Parts |
|---|---|
| Glycerol dichlorohydrin (35 mols) | 4,515 |
| Tetraethylenepentamine (10 mols) | 1,890 |
| Water | 10,650 |
| Sodium hydroxide (45 mols) | 1,800 |

The sodium hydroxide is dissolved in 2650 parts of water and the one-step procedure of Example 1 is followed. The resin produced in this manner has a capacity of about 20.5 kgrs. calcium carbonate per cubic foot of resin and a density of about 12.0 lbs./cu. ft.

*Example 9*

| | Parts |
|---|---|
| Glycerol dichlorohydrin (45 mols) | 5,805 |
| Tetraethylenepentamine (10 mols) | 1,890 |
| Water | 9,950 |
| Sodium hydroxide (65 mols) | 2,600 |

The sodium hydroxide is dissolved in 3350 parts of water and the substances are reacted as in Example 1 to produce a resin having a density of about 12.8 lbs./cu. ft. Its capacity is equivalent to about 18.5 kgrs. of calcium carbonate per cubic foot of resin.

*Example 10*

| | Parts |
|---|---|
| Glycerol dichlorohydrin (25 mols) | 3,225 |
| Diethylenetriamine (10 mols) | 1,030 |
| Water | 5,250 |
| Sodium hydroxide (35 mols) | 1,400 |

A solution consisting of the diethylenetriamine and 600 parts (15 mols) of sodium hydroxide in 3750 parts of water is charged into a suitable vessel and heated by steam. The glycerol dichlorohydrin is added slowly, with agitation, over a fifteen-minute period after which the mixture is heated an additional 30 minutes. The syrup is then transferred to another vessel, cooled to about 60° C., and 800 parts (20 mols) of sodium hydroxide in 1500 parts of water added. After heating, a non-homogeneous, orange-brown, opaque gel is formed within 10 minutes. This gel is treated in the same manner as those of the other examples, the resulting resin having a density of about 10.6 lbs./cu. ft. and a capacity for removing anions from the solution equivalent to about 12.9 kgrs. of calcium carbonate per cubic foot of resin.

*Example 11*

| | Parts |
|---|---|
| Melamine (10 mols) | 1,260 |
| Concentrated hydrochloric acid (10 mols) | 365 |
| Water | 6,360 |
| Epichlorohydrin (30 mols) | 2,774 |
| Tetraetrylenepentamine (7.5 mols) | 1,420 |
| Sodium hydroxide (20 mols) | 800 |

To a slurry consisting of the melamine, hydrochloric acid and water is added the epichlorohydrin over a period of about 45 minutes while heating the mixture over an oil bath maintained between 110° C. and 115° C. The temperature of the reaction mixture remains at about 94° C. throughout the addition but rises slowly to about 100° C. shortly after completion. The reaction mixture is heated for an additional half hour, filtered to remove slight traces of insoluble material, and the filtrate cooled. A glass-like material believed to be tris-(3-chloro-2-hydroxypropyl) melamine hydrochloride separates.

The tetraethylenepentamine is added to the hydrochloride and an exothermic reaction ensues, the temperature rising gradually to about 40° C. The slurry which is strongly basic is heated by means of steam until a neutral, slightly viscous syrup is obtained. The syrup is cooled to 50° C. and the sodium hydroxide added. The temperature rises rapidly to about 83° C. and then subsides so heating is resumed for about an hour at the end of which time the orange-colored gel is broken up and cured in the usual manner.

Other polyalkylene polyamines may be substituted for part or all of those used in the preceding examples. Furthermore, mixtures of two, three, four, five, seven or any other number of polyamines may be employed. Minor molar proportions of the polyalkylene polyamine may be replaced with ammonia or mono- or polyamines other than the alkylene polyamines. Preferably, however, polyalkylene polyamines are employed exclusively.

Examples of suitable polyamines include 1,3-diaminopropane, 1,4-diamino-n-butane, 1,3-diamino-n-butane, 1,5-diamino-n-pentane, 1,6-diamino-n-hexane, 1,10-diamino-n-decane, 1,6-diamino-3 methyl-n-hexane, 3,3'-diamino dipropyl ether and other similar diamines containing hetero atoms in the chains separating the amino groups, triethylene tetramine, pentaethylene hexamine and all of the higher homologs thereof containing additional —CH$_2$CH$_2$NH— groups in the chain between the primary amino groups, etc. Complex mixtures of polyethylene polyamines of high molecular weight obtained by the addition of large numbers of molecules of ammonia to ethylene dibromide or ethylene dichloride and the like may be used.

It is desirable that the molar ratio of glycerol dichlorohydrin (1,3-dichloro-propanol-2) to the polyamine be at least about 1.5:1 when the two substances are brought together in order to obtain insoluble resins. There is no maximum amount of dichlorohydrin which may be used but generally it should not exceed a molar ratio of 5:1 or with polyamines having more than five amino groups the ratio should not be greater than 1 mol of dichlorohydrin for each amino group in the polyamine. While proportions of dichlorohydrin larger than those mentioned may be used if desired, it will generally be undesirable since this will ordinarily reduce the capacity of the resulting resins. On the other hand, the use of higher ratios of dichlorohydrin to polyamine may be advantageous for economic reasons.

The addition of a strong alkali, such as sodium hydroxide, is desirable. When glycerol dichlorohydrin condenses with tetraethylenepentamine, hydrochloric acid is set free and if a neutralizing agent for that hydrochloric acid is not provided, the condensation proceeds very slowly. On the other hand, the use of alkali in large quantities is undesirable since the water-soluble content of the resins appears to depend, for the most part, upon the amount of alkali used in the preparation of the resin. The sodium chloride formed when the hydrochloric acid is neutralized by sodium hydroxide is dissolved out of the resin when the resin is placed in water, and thus the structural rigidity of the product is reduced. Any strong alkali may be used which will not condense with the glycerol dichlorohydrin. Examples of suitable substances are sodium hydroxide, sodium carbonate, potassium hydroxide, potassium carbonate, lithium hydroxide, calcium hydroxide, etc.

Instead of glyceral dichlorohydrin, other hydroxy aliphatic polyhalides having an hydroxy group in beta position to each halogen are suitable for reaction with polyamines in accordance with this invention to produce anion active resins. Some of these polyhalides are, for example:

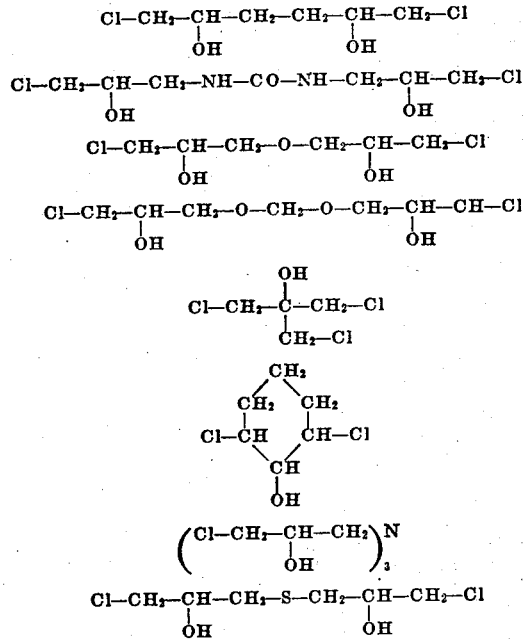

Corresponding compounds with other halogens such as, for example, bromine or iodine in place of the chlorine may also be used in the process of the present invention. The chlorine compounds are cheaper and more readily obtainable than the others and hence more attractive commercially, but the present invention is not intended to be restricted thereto.

A minor proportion of the polyhalides may be replaced in the reaction with a polyamine by the $\alpha$-chloro-beta, gamma-epoxy organic compounds described and claimed in the copending application of James R. Dudley and Lennart A. Lundberg, Serial No. 616,644 filed Sept. 15, 1945, and/or by the polyepoxy compounds disclosed and claimed in the James R. Dudley application Serial No. 655,005 filed March 16, 1946.

The condensation of the polyhalide and polyamine may be carried out in the presence of any desired solvent which does not react with the reactants or the reaction products such as water, methanol, ethanol, the monomethyl- or monoethyl-ethers of ethylene glycol, etc. While it is convenient to add the polyhalide to the polyamine, the order of addition may be reversed. It is immaterial whether all the polyhalide be introduced at once or whether it be introduced stepwise, since the corresponding resins obtained have practically identical capacities.

The reaction may be carried out at ordinary room temperatures and/or at elevated temperatures, the speed with which the reactants are mixed being controlled accordingly to avoid the difficulties which may arise from over heating. The difficulties which may arise are practical difficulties such as rapid boiling of the reaction mixture, loss of the reactive materials by vaporization, etc. In other words, the reaction temperature is not critical and therefore, the temperature may be varied from about 0° C. up to about 70° C. or even higher.

It is believed, and I do not wish to be limited to any particular theory of the mechanism of the reaction between the hydroxy polyhalides and polyamines, that epichlorohydrin or another alpha-chloro-beta, gamma-epoxy compound is first formed from the polyhalide and that it in turn reacts with the polyamine. Regardless of the mechanism, the final products closely resemble in physical properties and operating characteristics those resins prepared directly from an epichlorohydrin-type compound and a polyamine.

Since the resinous materials formed in accordance with this invention are condensation products, the curing of the resins is by condensation. Inasmuch as hydrochloric acid is set free, alkali may be added as pointed out heretofore to absorb excess acid. The heat treatment which is given to the resin is a final step of the process and although it has sometimes been called curing in the discussion, it is primarily a drying operation. During this heat-treatment the gel structure of the resin appears to be altered somewhat as considerable shrinkage occurs. When the resin is rewet it does not swell to the same volume as it did before the heat-treatment, although the resin still swells to some extent.

The final heat-treatment or curing of the resin in accordance with my invention is preferably carried out at a temperature of 95–105° C. in dry heat, although other conditions may be used including temperatures from 50° up to about 125° C. or higher.

The anion active resins may be activated or regenerated by means of dilute alkaline solutions, such as for example, 0.1–10% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from fluid media. They may be used to extract the strong mineral acids (preferably in relatively low concentrations), organic acids such as acetic acid, oxalic acid, etc., from water and organic liquids. The anions of salts such as chloride ion, from ammonium chloride, or a sulfate ion from ammonium sulfate may be removed by means of the resinous products described herein.

The anion active resins are useful for many purposes, examples of which are the removal of acid from water, the removal of acid from alcoholic solutions, the purification of sugar juices, the purification of pectin, the removal of acid from aqueous formaldehyde solutions, etc. While the resins are especially suitable for the removal of anions from aqueous media, they may be used to extract acids or anions from fluid media other than water, and they may even be used for the extraction of acids from gases. The resins may be used as absorbents for plant nutrients and as such may be used as a media for growing plants or as a means for applying nutrients to the soil.

To be sufficiently insoluble for practical use in the water purification art resins should have a sufficiently low solubility that it will not dissolve very rapidly by the solution to be treated. Thus, water should not dissolve more than 1 part of resin in 1000 parts of water when passed through a bed of resin (after the first cycle comprising an activation, exhaustion and reactivation of the resin).

This application is a continuation-in-part of the James R. Dudley and Lennart A. Lundberg application Serial No. 616,644 filed Sept. 15, 1945.

Obviously many modifications and variations in the processes and compositions described herein may be made without departing from the spirit and scope of the invention as defined in the appended claims.

I claim:

1. A resinous material as in claim 3 wherein the polyamine is a polyethylene polyamine.

2. A resinous material as in claim 3 wherein the polyamine is tetraethylenepentamine.

3. An insoluble granular resinous material obtained by a process comprising the steps of bringing together at least one alkylene polyamine and glycerol dichlorohydrin, permitting the resulting condensation product to gel, curing the resulting gel by heating, and granulating the cured gel, said granular resinous material being of such low water solubility that water will not dissolve more than one part of resin in 1,000 parts of water when it is passed through a bed of resin after a first cycle comprising an activation, an exhaustion and a reactivation of the resin.

4. An insoluble granular resinous material obtained by a process comprising the steps of bringing together glycerol dichlorohydrin and at least one alkylene polyamine, heating the resulting condensation product in the presence of a strong alkali to cause it to gel rapidly, curing the resulting gel by heating, and granulating the gel, said granular resinous material being of such low water solubility that water will not dissolve more than one part of resin in 1,000 parts of water when it is passed through a bed of resin after a first cycle comprising an activation, an exhaustion and a reactivation of the resin.

5. A process of preparing an insoluble granular resinous material which comprises bringing together at least one alkylene polyamine and glycerol dichlorohydrin to form a gel, heating the gel thus obtained, and granulating the heated gel, said granular resinous material being of such low water solubility that water will not dissolve more than one part of resin in 1,000 parts of water when it is passed through a bed of resin after a first cycle comprising an activation, an exhaustion and a reactivation of the resin.

6. A process of preparing an insoluble granular resinous material which comprises bringing together at least one alkylene polyamine and glycerol dichlorohydrin in the presence of strong alkali to form a gel, heating the gel thus obtained, and granulating the heated gel, said granular resinous material being of such low water solubility that water will not dissolve more than one part of resin in 1,000 parts of water when it is passed through a bed of resin after a first cycle comprising an activation, an exhaustion and a reactivation of the resin.

7. The process of claim 5 wherein the polyamine is a polyethylene polyamine.

8. The process of claim 5 wherein the polyamine is tetraethylenepentamine.

9. A process of preparing an insoluble granular resinous material which comprises heating at least one alkylene polyamine with glycerol dichlorohydrin in the molar proportion of 1:1.25, cooling the resulting condensation product, adding a strong alkali to said cooled condensation product, adding a further amount of glycerol dichlorohydrin, heating the resulting mixture to cause it to gel, curing the resulting gel by heating, and granulating the gel, said granular resinous material being of such low water solubility that water will not dissolve more than one part of resin in 1,000 parts of water when it is passed through a bed of resin after a first cycle comprising an activation, an exhaustion and a reactivation of the resin.

LENNART A. LUNDBERG.

REFERENCES CITED

The following references are of record in the file of this patent:

UNITED STATES PATENTS

| Number | Name | Date |
|---|---|---|
| 2,104,092 | Munz | Jan. 4, 1938 |
| 2,223,930 | Griessbach | Dec. 3, 1940 |
| 2,228,514 | Griessbach | Jan. 14, 1941 |
| 2,354,172 | Myers | July 18, 1944 |

FOREIGN PATENTS

| Number | Country | Date |
|---|---|---|
| 694,991 | Germany | Aug. 13, 1940 |
| 771,836 | France | Aug. 6, 1934 |